C. A. HAAS.
CHECK VALVE FOR PNEUMATIC TIRES.
APPLICATION FILED JULY 24, 1909.
1,043,224.
Patented Nov. 5, 1912.
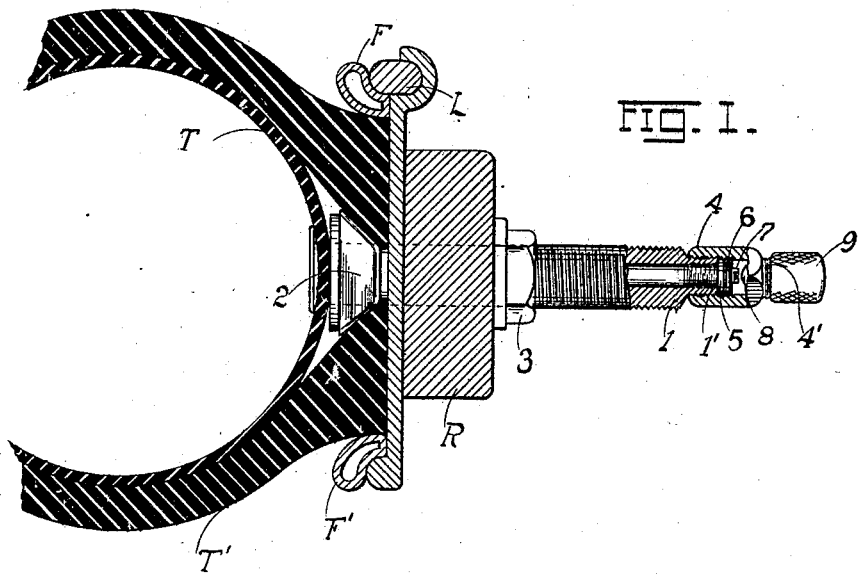
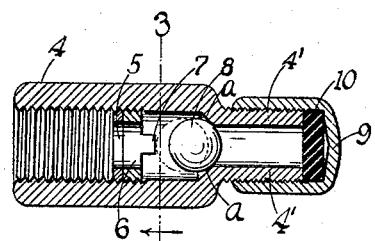
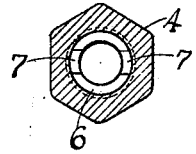
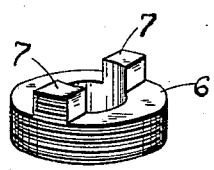
WITNESSES:
Harry A. Benner
Fannie E. Weber
INVENTOR.
Cyrus A. Haas.
BY
ATTORNEY.

UNITED STATES PATENT OFFICE.

CYRUS A. HAAS, OF ST. LOUIS, MISSOURI.

CHECK-VALVE FOR PNEUMATIC TIRES.

1,043,224.  Specification of Letters Patent.  Patented Nov. 5, 1912.

Application filed July 24, 1909. Serial No. 509,423.

*To all whom it may concern:*

Be it known that I, CYRUS A. HAAS, citizen of the United States, residing at St. Louis, State of Missouri, have invented certain new and useful Improvements in Check-Valves for Pneumatic Tires, of which the following is a full, clear, and exact description, reference being had to the accompanying drawings, forming a part hereof.

My invention has relation to improvements in check-valves for pneumatic tires; and it consists in the novel construction of valve more fully set forth in the specification and pointed out in the claims.

In the drawings, Figure 1 is a cross-section of a pneumatic tire (broken away) and supporting rim, showing my check-valve both in section and elevation, applied thereto; Fig. 2 is an enlarged middle longitudinal section of the valve; Fig. 3 is a cross-section on the line 3—3 of Fig. 2; and Fig. 4 is a detached perspective of the stop or ring which arrests the inward movement of the spherical ball or valve.

The object of my invention is to provide the prevailing form of automobile or other pneumatic tire with a check-valve attachment which will make the inflation of such tire easy, consuming a minimum amount of energy on the part of either the operator by whom, or the motor by which the pump inflating the tire may be actuated.

A further object is to construct a valve which shall be simple, readily attachable to prevailing tires, one which shall be cheap, durable, light and air tight.

In detail the invention may be described as follows:—Referring to the drawings, T represents the inner inflatable tire, and T' the outer section as well understood in the art. In the present illustration is shown a wooden rim R to which the rubber section T' is secured by the locking ring L; the outside removable flange F and the inside removable flange F' as shown being common constructions in the art. With these my invention is not immediately concerned. In the prevailing forms of pneumatic tires, there is present the tube or valve-stem 1 terminating at its inner end in a flaring head or mouth 2 in communication with the inflatable tire section, the tube being exteriorly screw-threaded and carrying a lock-nut 3 by which the head 2 is drawn firmly against the edges of the outer envelop or section T'.

The outer reduced stem or nipple 1' in the prevailing constructions carries a check-valve which in the present instance is omitted and in lieu thereof is substituted the check-valve attachment forming the subject-matter of the present invention. This consists of a valve-casing 4 screw-threaded on the interior so as to screw over the reduced extension 1' as shown (Fig. 1). The casing 4 is provided with an annular metallic washer 5 resting against the base of the valve-stop or ring 6 screwed into the casing, and when the latter is fully driven home, the washer 5 will press against the end of the reduced stem 1' of the tube 1. Formed with the outer end or face of the ring 6 and disposed diametrically opposite one another are lugs or projections 7, 7, the thickness of the lugs corresponding preferably to the width of the face of the ring between its inner and outer circles (Figs. 3, 4). These lugs serve to arrest the spherical check-valve 8 (composed of metal preferably brass) when the latter is unseated by an influx of air into the tube 1 for the purpose of inflating the tire T.

It will be noticed (Figs. 3, 4) that the width of the lug 7 is slightly less than (and in practice should not exceed) the diameter of the opening in the ring 6, such a construction offering a minimum degree of resistance to the influx of air entering the tube 1, the air having a chance to flow into the ring from practically all directions.

A seat *a* for the valve is formed at the base of the reduced exteriorly screw-threaded stem or neck 4' forming the outer terminal of the valve-casing 4, over which neck the end of the hose (not shown) leading from any available air pump is passed during the inflating operation as well understood in the art.

When the inflation is complete, the compressed air within the tire drives the check-valve 8 against the conical seat *a*, and the neck 4' is closed by a valve-cap 9 preferably provided with a compressible packing disk 10 at the bottom thereof for engaging the end of the neck (Fig. 2). During the inflating operation the inflowing air unseats the valve 8 forcing it against the lugs 7, 7, of the valve-stop or ring 6, the air passing through the opening of the ring between the lugs and valve 8 as clearly obvious from the drawings (see dotted position of valve Fig. 2). The casing 4 is preferably polygonal on the outside so it can be seized by hand or by a wrench and driven home on the tube 1 where it remains a permanent attachment to the wheel.

The sphere or ball 8 is of course, sensitive to any disturbance from without, its spherical surface readily yielding to the passage of an inflowing air current so that the operation of pumping and attendant inflation is made extremely easy. At the same time the conical seat $a$ for the valve makes an air tight joint and prevents escapement of any air once the tire is inflated, the air within the tire driving the valve firmly against its seat.

Having described my invention, what I claim is:—

1. In combination with a valve-stem, a check-valve comprising a valve-casing coupled to the outside of said stem and provided with a valve-seat, a valve normally forced to said seat under fluid-pressure from the valve-stem, a perforated stop in the valve-casing removed a suitable distance from the valve-seat for arresting and positioning the valve during the inflation of the tire, and a washer interposed between the stop and the end of the valve-stem, and compressed between said stem and stop.

2. In combination with a valve-stem, a valve-casing coupled to the outside thereof and provided with a valve-seat, a valve in the casing normally forced to said seat under fluid pressure from the valve-stem, a perforated abutment located within the casing and limiting the distance the stem shall enter the casing whereby a tight joint is formed, said abutment being removed from the valve-seat, and members disposed about the center of the abutment and projecting from and beyond the plane of the face thereof on the side adjacent the valve-seat for engaging the valve during inflation.

3. In combination with a valve-stem, a check-valve comprising a valve-casing coupled to said stem, and provided with a valve-seat, a spherical valve normally forced to said seat under fluid-pressure from the valve-stem, a ring within the casing engaging the adjacent end of the valve-stem and removed from the valve-seat, lugs projecting from and beyond the plane of the face of the ring on the side adjacent the valve-seat for engaging the valve during inflation, and means for closing the opening leading to the valve-seat.

In testimony whereof I affix my signature, in presence of two witnesses.

CYRUS A. HAAS.

Witnesses:
EMIL STAREK,
FANNIE E. WEBER.